(12) United States Patent
Omura et al.

(10) Patent No.: US 11,146,087 B2
(45) Date of Patent: Oct. 12, 2021

(54) ELECTRIC WORKING MACHINE

(71) Applicant: MAKITA CORPORATION, Anjo (JP)

(72) Inventors: Motohiro Omura, Anjo (JP); Junya Matsushita, Anjo (JP); Yoshitaka Ichikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/884,788

(22) Filed: May 27, 2020

(65) Prior Publication Data
US 2020/0381933 A1 Dec. 3, 2020

(30) Foreign Application Priority Data

May 28, 2019 (JP) .............................. JP2019-099341

(51) Int. Cl.
*H02J 7/00* (2006.01)
*B25F 5/00* (2006.01)
*B25F 5/02* (2006.01)

(52) U.S. Cl.
CPC .............. *H02J 7/0063* (2013.01); *B25F 5/00* (2013.01); *H02J 7/0031* (2013.01); *H02J 7/0047* (2013.01); *H02J 7/00306* (2020.01); *B25F 5/02* (2013.01); *H02J 2207/10* (2020.01)

(58) Field of Classification Search
CPC .... H02J 7/0031; H02J 7/0063; H02J 7/00306; H02J 2207/10; H02J 7/0047; G06F 1/26; B25F 5/00
See application file for complete search history.

(56) References Cited

U.S. PATENT DOCUMENTS 9,203,249 B2 * 12/2015 Noda ........................ H02J 9/005
2006/0214627 A1 * 9/2006 Ito ............................ H01M 10/44
320/107

FOREIGN PATENT DOCUMENTS

JP 2006-341325 A 12/2006

* cited by examiner

*Primary Examiner* — Ryan Johnson
(74) *Attorney, Agent, or Firm* — Oliff PLC

(57) ABSTRACT

An electric working machine of one aspect of the present disclosure includes a connection port, a control circuit, and/or a power supply switch. The power supply switch is provided on a power supply path extending from a battery pack connected to the connection port to the control circuit. The power supply switch maintains an ON state while a power supply permission signal is output from the battery pack to the electric working machine. The control circuit outputs an ON-command signal to the power supply switch for a specified period of time in response to loss of the power supply permission signal from the battery pack.

14 Claims, 12 Drawing Sheets

ELECTRIC WORKING MACHINE

CROSS-REFERENCE TO RELATED APPLICATIONS

This application claims the benefit of Japanese Patent Application No. 2019-099341 filed on May 28, 2019 with the Japan Patent Office, the entire disclosure of which is incorporated herein by reference.

BACKGROUND

The present disclosure relates to an electric working machine.

An electric power tool disclosed in Japanese Unexamined Patent Application Publication No. 2006-341325 includes a trigger switch and a control circuit, and operates by receiving electric power from a battery pack. In this electric power tool, when the trigger switch is turned OFF, the control circuit is electrically disconnected from the battery pack, and power supply from the battery pack to the control circuit is stopped. This results in reducing power consumption by the control circuit in the electric power tool.

SUMMARY

There are cases where power supply from the battery pack to the control circuit of the electric power tool should be prohibited, such as where the battery pack is in an over-discharge state. Thus, a configuration may be employed in which power supply to the control circuit is controlled according to whether a power supply permission signal is output from the battery pack to the electric power tool.

However, if the electric power tool is configured such that power supply to the control circuit is stopped in response to the power supply permission signal not being output from the battery pack to the electric power tool, a sudden shut-off of power to the control circuit may occur. Such a sudden shut-off of power to the control circuit may hinder a process performed by the control circuit.

In one aspect of the present disclosure, it is desirable to be able to provide an electric working machine in which, upon a sudden loss of a power supply permission signal from a battery pack to the electric working machine, influence of the loss of the power supply permission signal can be reduced.

An electric working machine according to one aspect of the present disclosure includes a connection port, a control circuit, and/or a power supply switch. The connection port is connected to a battery pack. The control circuit controls an operation of the electric working machine. The power supply switch is provided on a power supply path extending from the battery pack connected to the connection port to the control circuit, and maintains an ON state while a power supply permission signal is output from the battery pack to the electric working machine. The power supply path maintains a completed state while the power supply switch is in the ON state. The power supply permission signal permits the control circuit to receive an electric power from the battery pack. The control circuit outputs an ON-command signal to the power supply switch for a set period of time in response to loss of the power supply permission signal from the battery pack. The ON-command signal brings the power supply switch to the ON state.

In the electric working machine according to one aspect of the present disclosure, even after the power supply permission signal from the battery pack to the electric working machine is lost, the ON-command signal is output from the control circuit for the set period of time so that power supply to the control circuit is maintained. Thus, even when the power supply permission signal is lost while the control circuit is performing a write process, a nailing process, or other process, interruption of such process can be avoided. That is, when the power supply permission signal from the battery pack to the electric working machine is lost, influence of the loss of the power supply permission signal can be reduced. The write process is a process of writing a usage history, settings, or other data of the electric working machine, to a storage memory. The nailing process is a process of driving a nail into a workpiece.

The electric working machine may further include a differentiating circuit provided on a transmission path. The transmission path is a path for transmission of the ON-command signal, and extends from the control circuit to the power supply switch.

By providing the differentiating circuit on the transmission path, the ON-command signal is transmitted to the power supply switch via the differentiating circuit. Thus, even when the ON-command signal continues to be output due to a failure in the control circuit, continued receipt of the ON-command signal by the power supply switch can be avoided. Accordingly, if the failure occurs in the control circuit and also the power supply permission signal is lost, power supply to the control circuit can be shut off by switching the power supply switch from ON to OFF after lapse of a period of time according to a time constant of the differentiating circuit. Consequently, when protection of the battery pack is necessary, the battery pack can be protected even at occurrence of the failure in the control circuit.

The control circuit may output the ON-command signal to the power supply switch before performing a specified process.

The ON-command signal is output to the power supply switch before the specified process is performed. As a result, even when the power supply permission signal from the battery pack to the electric working machine is lost before or while the specified process is performed, the control circuit can perform the specified process by receiving power supply. The specified process includes a data storage process, a process of wireless communication with an external device, and other processes.

The control circuit may include a first memory and a second memory. The specified process may include a write process. The write process is a process of writing, to the second memory, a data on the first memory. The control circuit may perform the write process in response to a number of updates of the data on the first memory reaching a set value.

Each time the number of updates of the data on the first memory reaches the set value, the data on the first memory is written to the second memory. This makes it possible to avoid frequent writes to the second memory, thereby reducing the number of writes to the second memory and power consumption in the control circuit.

The control circuit may include a first memory and a second memory. The specified process may include a write process. The write process is a process of writing, to the second memory, a data on the first memory. The control circuit may perform the write process in response to loss of the power supply permission signal from the battery pack.

If power supply to the control circuit is shut off before the number of updates of the data on the first memory reaches the set value, the data on the first memory is to be lost. To avoid this, the write process is performed in response to loss of the power supply permission signal. Thus, even when the power supply permission signal is suddenly lost, the control circuit can store, in the second memory, the data on the first memory while outputting the ON-command signal.

The electric working machine may further include an operation switch configured to be operated by a user to operate or stop the electric working machine. The control circuit may include a first memory and a second memory. The specified process may include a write process. The write process is a process of writing, to the second memory, a data on the first memory. The control circuit may perform the write process in response to the operation switch being turned from ON to OFF. The control circuit may enter a sleep mode in response to completion of the write process. The control circuit is reduced in power consumption in the sleep mode.

In the sleep mode, the write process is not performed. Thus, in response to the operation switch being turned OFF, the control circuit performs the write process before entering the sleep mode. This makes it possible to properly store, in the second memory, the data on the first memory.

The set period of time may be longer than a period of time required from start to completion of the write process by the control circuit in response to loss of the power supply permission signal.

The ON-command signal is output from the control circuit to the power supply switch for a period longer than that required for the control circuit to complete the write process. This enables the control circuit to continuously receive power supply after loss of the power supply permission signal, to thereby complete the write process. Thus, the data on the first memory can be stored in the second memory without being damaged.

The power supply permission signal may be lost in response to: (i) switching of a signal output from the battery pack to the electric working machine from the power supply permission signal to a power supply prohibition signal; or (ii) removal of the battery pack from the connection port. The power supply prohibition signal prohibits the control circuit from receiving the electric power from the battery pack.

The power supply permission signal is lost in response to switching from the power supply permission signal to the power supply prohibition signal, or in response to removal of the battery pack from the electric working machine.

The battery pack may include a first terminal and a second terminal. The first terminal is electrically connected to a positive electrode of the battery pack (i.e., to a positive electrode of a group of battery cells connected in series to each other). The second terminal is electrically connected to a negative electrode of the battery pack (i.e., to a negative electrode of the group of battery cells connected in series to each other). The connection port may include a positive terminal and a negative terminal. The positive terminal is connected to the first terminal. The negative terminal is connected to the second terminal. The electric working machine may further include an electrolytic capacitor and a power supply circuit. The electrolytic capacitor is connected across the positive terminal and the negative terminal. The power supply circuit is connected across the positive terminal and the negative terminal, and generates, from a first electric power input thereto, a second electric power to be supplied to the control circuit.

When the battery pack is connected to the positive terminal and to the negative terminal, electric power of the battery pack is input to the power supply circuit, and the second electric power to be supplied to the control circuit is generated from the first electric power input from the battery pack. On the other hand, when the battery pack is not connected to the positive terminal and to the negative terminal, electric power accumulated in the electrolytic capacitor is input to the power supply circuit. Thus, in this case, the second electric power to be supplied to the control circuit is generated from the first electric power input from the electrolytic capacitor. Thus, even when the battery pack is suddenly removed from the electric working machine, the power supply circuit can supply the second electric power to the control circuit by utilizing the electrolytic capacitor as an auxiliary power source. Consequently, even when the battery pack is suddenly removed from the electric working machine, the control circuit can perform the specified process by receiving power supply for a set period of time.

The control circuit may determine that the battery pack has been removed from the connection port in response to a value of a voltage input to the power supply circuit falling below a detection voltage value that has been set.

In response to the value of the voltage input to the power supply circuit falling below the detection voltage value, the control circuit determines that the battery pack has been removed from the connection port, and can thereby recognize loss of the power supply permission signal.

The detection voltage value may be greater than or equal to a value of a voltage required for the power supply circuit to generate the electric power of a set voltage.

Determination of removal of the battery pack from the connection port is made before the value of the voltage input to the power supply circuit falls below the value of the voltage required to generate the electric power of the set voltage. Thus, the control circuit can continuously receive the electric power from the power supply circuit by outputting the ON-command signal to the power supply switch before it becomes impossible for the power supply circuit to generate the electric power of the set voltage.

BRIEF DESCRIPTION OF THE DRAWINGS

Example embodiments for carrying out the present disclosure will be described below with reference to the accompanying drawings, in which.

DETAILED DESCRIPTION OF EXEMPLARY EMBODIMENTS

First Embodiment

<1-1. Configuration>

Figure 1:
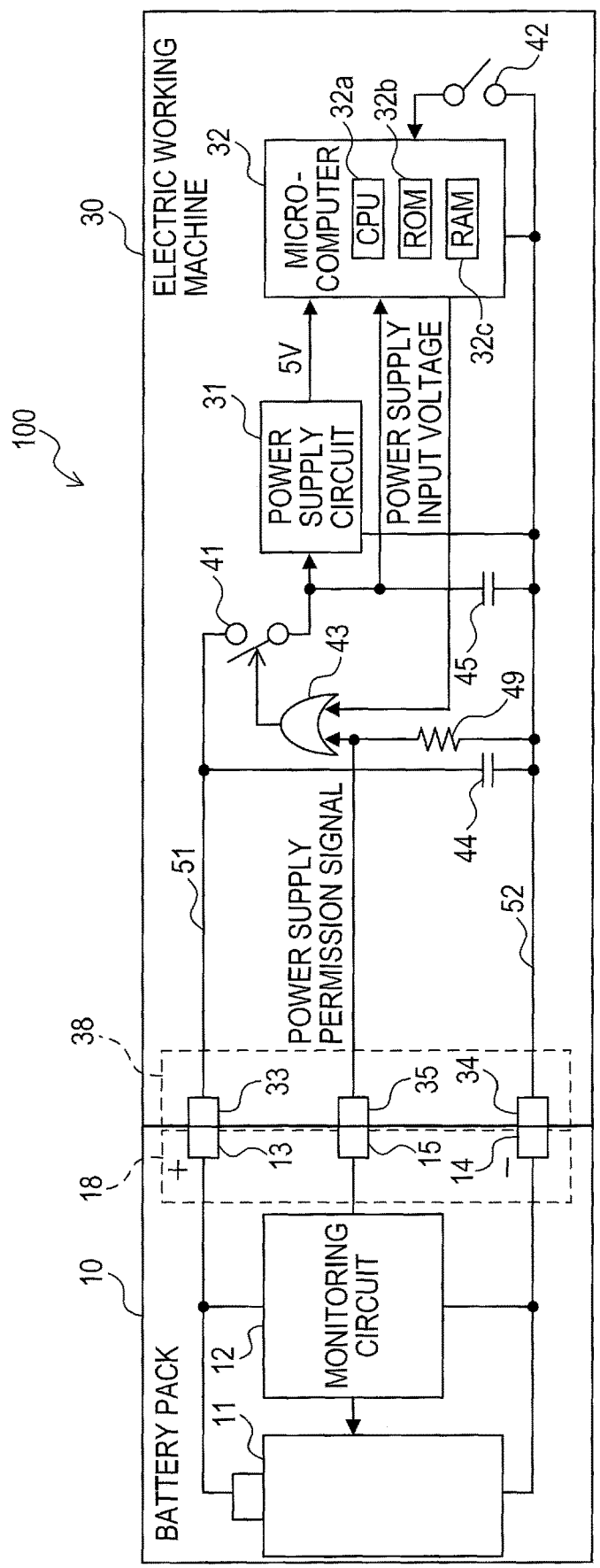
FIG. 1 is a diagram illustrating a configuration of an electric working machine system of a first embodiment.

Firstly, an explanation will be given of a configuration of an electric working machine system 100 of a first embodiment with reference to FIG. 1. The electric working machine system 100 includes a battery pack 10 and an electric working machine 30.

The battery pack 10 includes a battery 11, a monitoring circuit 12, and a battery-side connection port 18. The battery-side connection port 18 includes a battery-side positive terminal 13, a battery-side negative terminal 14, and a battery-side communication terminal 15.

The battery 11 is a rechargeable battery configured with two or more battery cells connected in series to each other. The battery 11 is, for example, a lithium-ion battery, and its rated voltage is, for example, 36 V. A positive electrode of the battery 11 is connected to the battery-side positive terminal 13, and a negative electrode of the battery 11 is connected to the battery-side negative terminal 14.

The monitoring circuit 12 monitors a cell voltage of each battery cell included in the battery 11, a cell temperature of at least one battery cell, a charge/discharge current flowing through the battery 11, and so on. Then, the monitoring circuit 12 determines, based on values of the respective parameters it is monitoring, whether the battery 11 is in an over-discharge state.

Upon determining that the battery 11 is not in the over-discharge state, the monitoring circuit 12 outputs a power supply permission signal to the electric working machine 30 through the battery-side communication terminal 15. In contrast, upon determining that the battery 11 is in the over-discharge state, the monitoring circuit 12 outputs a power supply prohibition signal to the electric working machine 30 through the battery-side communication terminal 15. The power supply permission signal permits a microcomputer 32 (to be described below) of the electric working machine 30 to receive electric power from the battery 11. In the present embodiment, the power supply permission signal is a HIGH signal. On the other hand, the power supply prohibition signal prohibits the microcomputer 32 from receiving electric power from the battery 11. Specifically, the power supply prohibition signal commands the microcomputer 32 to shut down. In the present embodiment, the power supply prohibition signal is a LOW signal.

The electric working machine 30 is a working machine to operate by receiving electric power from the battery pack 10. The electric working machine 30 is, for example, an electric power tool or electric gardening equipment configured such that a tip tool is driven by motor power. Alternatively, the electric working machine 30 may be a laser marking device, a radio, a lighting device, or the like, not using motor power.

The electric working machine 30 includes a power supply circuit 31, the microcomputer 32, a power supply switch 41, a trigger switch 42, an OR (logical sum) circuit 43, a first capacitor 44, a second capacitor 45, a working-machine-side connection port 38, and a pull-down resistor 49. The working-machine-side connection port 38 includes a working-machine-side positive terminal 33, a working-machine-side negative terminal 34, and a working-machine-side communication terminal 35.

The working-machine-side positive terminal 33 is connected to the battery-side positive terminal 13. The working-machine-side negative terminal 34 is connected to the battery-side negative terminal 14. The working-machine-side communication terminal 35 is connected to the battery-side communication terminal 15. The pull-down resistor 49 is connected between the working-machine-side communication terminal 35 and the working-machine-side negative terminal 34. In the present embodiment, the battery-side positive terminal 13 corresponds to one example of a first terminal of the present disclosure, and the battery-side negative terminal 14 corresponds to one example of a second terminal of the present disclosure. The first terminal is not limited to a positive terminal of the battery pack 10 but may be a terminal electrically connected to a positive electrode of the battery pack 10 via, for example, a regulator or the like. Similarly, the second terminal is not limited to a negative terminal of the battery pack 10 but may be a terminal electrically connected to a negative electrode of the battery pack 10.

The power supply circuit 31 is connected to the working-machine-side positive terminal 33 via a positive electrode line 51, and also connected to the working-machine-side negative terminal 34 via a negative electrode line 52. The power supply switch 41 is provided on the positive electrode line 51. When the power supply switch 41 is ON, the positive electrode line 51 is in a completed state. This allows electric power input across the working-machine-side positive terminal 33 and the working-machine-side negative terminal 34 from the battery pack 10 to be input to the power supply circuit 31. In contrast, when the power supply switch 41 is OFF, the positive electrode line 51 is in an interrupted state.

When the power supply switch 41 is ON, the power supply circuit 31 generates electric power of a specified voltage to be supplied to various circuits, including the microcomputer 32, from the electric power input across the positive electrode line 51 and the negative electrode line 52. In the present embodiment, the power supply circuit 31 generates electric power of 5 V and supplies it to the microcomputer 32.

The trigger switch 42 is operated by a user to operate or stop the electric working machine 30. An operation signal of the trigger switch 42 is input to the microcomputer 32.

The microcomputer 32, which includes a CPU 32a, a ROM 32b, a RAM 32c, I/Os, and so on, is a control circuit activated by receiving the electric power from the power supply circuit 31. In a case where the microcomputer 32 detects OFF of the trigger switch 42, the microcomputer 32 shifts to a sleep mode upon lapse of a specified period of time after the detection of OFF. In the sleep mode, power consumption of the microcomputer 32 is reduced. The microcomputer 32 shuts down when power supply from the power supply circuit 31 is shut off.

The microcomputer 32 achieves various functions by the CPU 32a executing a program stored in the ROM 32b. The RAM 32c is a volatile work memory, in which various data are temporarily stored. The ROM 32b is a non-volatile storage memory. In a case where the data on the RAM 32c increases to reach a set amount, the microcomputer 32 performs a write process before shifting to the sleep mode and at power shut-off. In the write process, the data on the RAM 32c is written to the ROM 32b. Further, while performing the write process, the microcomputer 32 outputs an ON-command signal for switching ON the power supply switch 41. The ON-command signal is a HIGH signal. Details of the output of the ON-command signal will be described below. In the present embodiment, the RAM 32c corresponds to one example of a first memory of the present disclosure, and the ROM 32b corresponds to one example of a second memory of the present disclosure.

The first capacitor 44 is arranged between: the power supply circuit 31 and the power supply switch 41; and the working-machine-side positive terminal 33 and the working-machine-side negative terminal 34, and is connected between the positive electrode line 51 and the negative electrode line 52. The first capacitor 44 is an electrolytic capacitor to absorb a surge voltage included in the input electric power. A capacitance of the first capacitor 44 is large and, for example, 1000 µF or larger. Thus, for some time after the battery pack 10 is removed from the electric working machine 30, the power supply circuit 31 can generate electric power by utilizing residual electric charge of the first capacitor 44. That is, the power supply circuit 31 can utilize the first capacitor 44 as an auxiliary power source.

The second capacitor 45 is arranged between the power supply circuit 31 and the power supply switch 41, and is connected between the positive electrode line 51 and the negative electrode line 52. The second capacitor 45 is an electrolytic capacitor provided so that the microcomputer 32 detects a voltage of the electric power input to the power supply circuit 31. The microcomputer 32 is connected to a positive electrode of the second capacitor 45 and to the negative electrode line 52, and detects the input voltage based on a voltage of the second capacitor 45. A capacitance of the second capacitor 45 is much smaller than that of the first capacitor 44 and, for example, approximately 10 µF.

The OR circuit 43 includes a first input terminal, a second input terminal, and one output terminal. The power supply permission signal or the power supply prohibition signal output from the monitoring circuit 12 is input to the first input terminal through the battery-side communication terminal 15 and the working-machine-side communication terminal 35. The first input terminal is pulled down to the negative electrode line 52 by the pull-down resistor 49. Upon removal of the battery pack 10 from the electric working machine 30, an electric potential of the first input terminal becomes a LOW level, or in other words, a LOW signal is input to the first input terminal. The ON-command signal output from the microcomputer 32 is input to the second input terminal. When at least one of the power supply permission signal or the ON-command signal is input, the OR circuit 43 outputs a HIGH signal to the power supply switch 41 through the output terminal. In contrast, when neither the power supply permission signal nor the ON-command signal is input, the OR circuit 43 outputs a LOW signal to the power supply switch 41 through the output terminal. The power supply switch 41 is switched ON in response to the input of the HIGH signal, and is switched OFF in response to the input of the LOW signal. That is, the power supply switch 41 is switched ON when the HIGH signal is output from at least one of the monitoring circuit 12 of the battery pack 10 or the microcomputer 32 of the electric working machine 30.

<1-2. Data Storage Process>
<1-2-1. Data Storage Process at Large Number of Updates>

Figure 2:
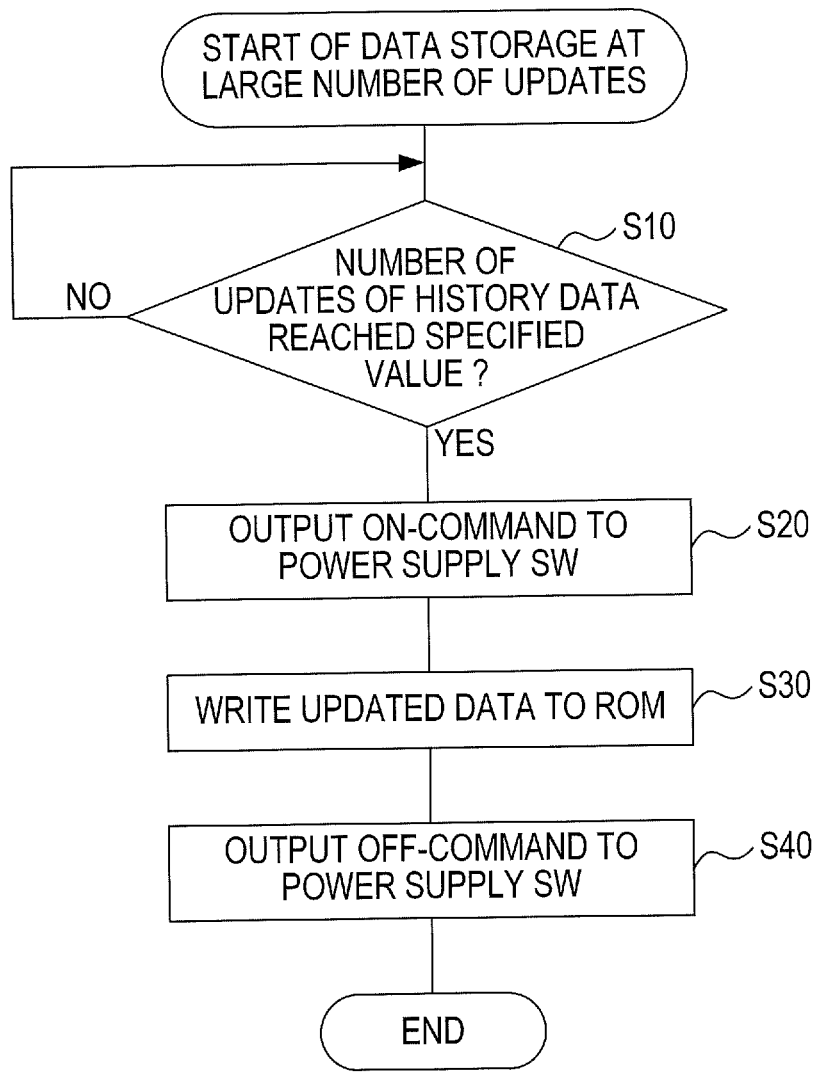
FIG. 2 is a flowchart illustrating steps of a data storage process in a case where the number of updates has reached a specified value.

Next, an explanation will be given of a data storage process in a case where the number of updates is large, which is performed by the microcomputer 32, with reference to a flowchart of FIG. 2. There is an upper limit to the number of writes to the ROM 32b. Further, write of the data to the ROM 32b results in power consumption of the battery pack 10. Thus, in order to reduce the number of writes and to conserve the electric power of the battery pack 10, after a certain amount of data is accumulated on the RAM 32c, the microcomputer 32 stores the data in the ROM 32b. Specifically, the microcomputer 32 stores, in the ROM 32b, the data on the RAM 32c when difference between the data on the RAM 32c and the data on the ROM 32b has become significant.

Firstly, in S10, the microcomputer 32 determines whether the number of updates of usage history data of the electric working machine 30 accumulated on the RAM 32c has reached a specified value set in advance. That is, the microcomputer 32 determines whether a time to update the ROM 32b has come. Upon determining in S10 that the number of updates has reached the specified value, the microcomputer 32 proceeds to S20. In contrast, upon determining in S10 that the number of updates has not reached the specified value, the microcomputer 32 repeatedly performs the process of S10 until it determines that the number of updates has reached the specified value.

Then, in S20, the microcomputer 32 outputs the ON-command signal to the power supply switch 41. Here, if the power supply permission signal from the battery pack 10 is lost during the write of the usage history data to the ROM 32b to thereby switch the power supply switch 41 OFF, the microcomputer 32 shuts down. If the microcomputer 32 shuts down during the write, an error may occur in the data written to the ROM 32b. Thus, in order to avoid the power supply switch 41 from being switched OFF even when the power supply permission signal from the battery pack 10 is lost during the write, the microcomputer 32 outputs the ON-command signal to the power supply switch 41 prior to the write.

This causes output of a HIGH signal from the OR circuit 43 to the power supply switch 41, thereby bringing the power supply switch 41 to an ON state, regardless of whether the power supply permission signal is being output from the battery pack 10. Accordingly, even when the power supply permission signal from the battery pack 10 is lost during the write, shut-down of the microcomputer 32 can be avoided. Loss of the power supply permission signal occurs when the output signal from the battery pack 10 is switched from the power supply permission signal to the power supply prohibition signal, or in response to removal of the battery pack 10 from the electric working machine 30.

Subsequently, in S30, the microcomputer 32 performs the write process. In the write process, the microcomputer 32 writes, to the ROM 32b, the usage history data on the RAM 32c. Upon completion of the write process, the microcomputer 32 proceeds to S40.

Next, in S40, the microcomputer 32 outputs an OFF-command signal to the power supply switch 41. The OFF-command signal is a LOW signal. This makes it possible to shut down the microcomputer 32 after completion of the write process, if the power supply permission signal is not output from the battery pack 10.

<1-2-2. Data Storage Process Before Entering Sleep Mode>

Figure 3:
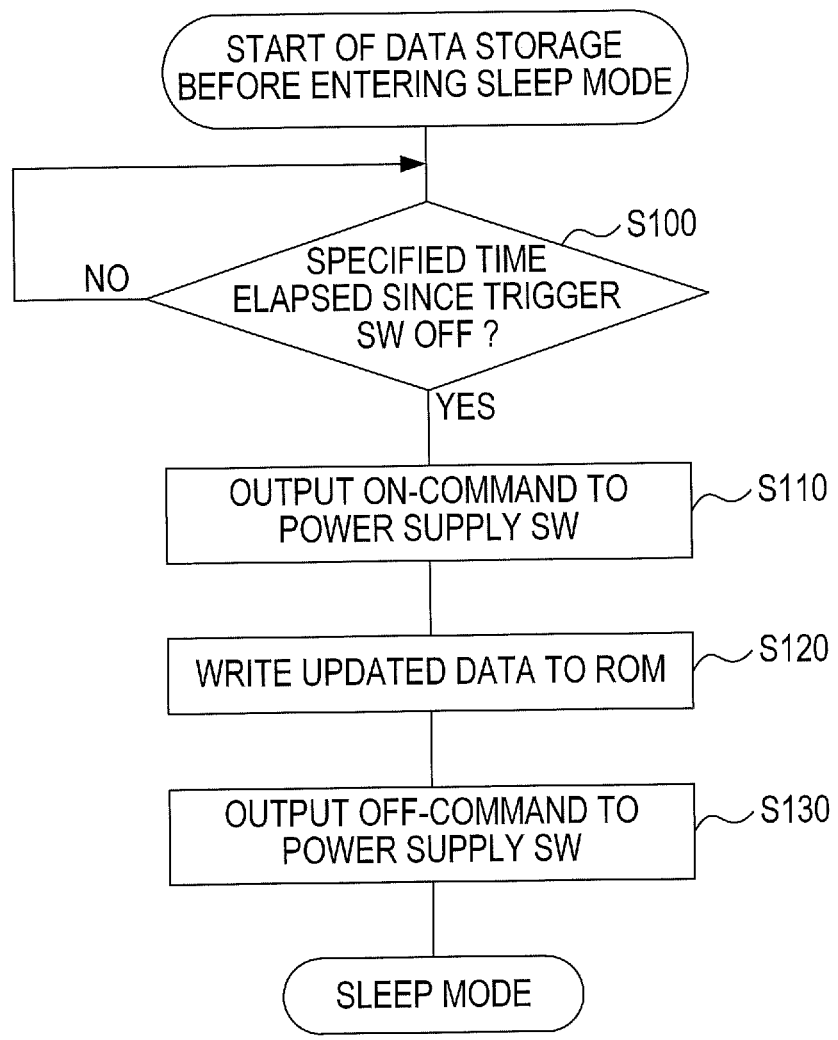
FIG. 3 is a flowchart illustrating steps of a data storage process before entering a sleep mode.

Next, an explanation will be given of a data storage process before entering a sleep mode, which is performed by the microcomputer 32, with reference to a flowchart of FIG. 3. The microcomputer 32 does not update the usage history data on the RAM 32c while in the sleep mode, and thus stores, in the ROM 32b, the usage history data on the RAM 32c before entering the sleep mode.

Firstly, in S100, the microcomputer 32 determines whether a specified period of time Tb set in advance has elapsed since detection of OFF of the trigger switch 42. Upon determining in S100 that the specified period of time Tb has elapsed, the microcomputer 32 proceeds to S110. In contrast, upon determining in S100 that the specified period of time Tb has not elapsed, the microcomputer 32 repeatedly performs the process of S100 until it determines that the specified period of time Tb has elapsed.

Subsequently, in S110 to S130, the microcomputer 32 performs processes similar to those of S20 to S40. Then, the microcomputer 32 shifts to the sleep mode.

<1-2-3. Data Storage Process at Power Shut-Off>

Figure 4:
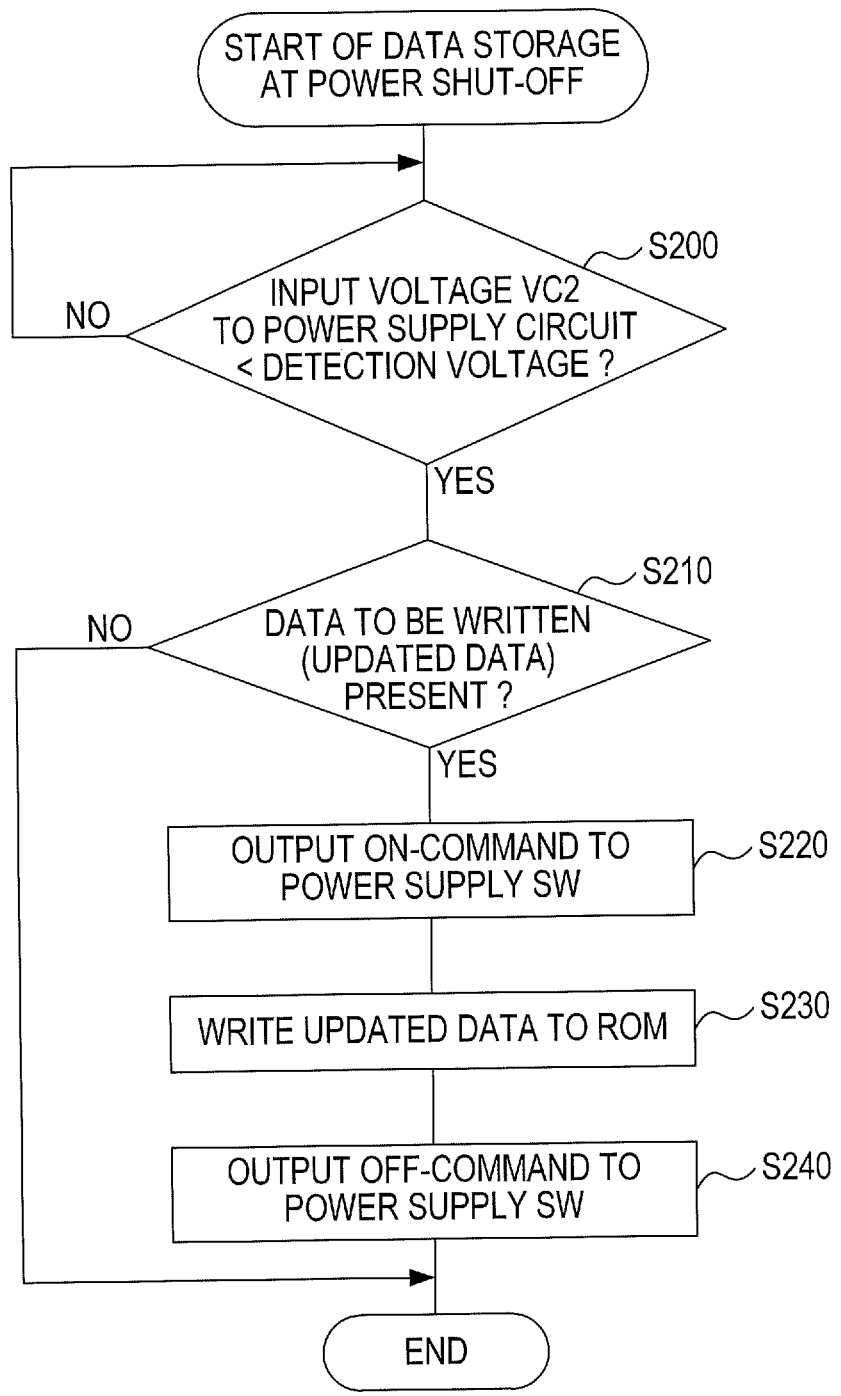
FIG. 4 is a flowchart illustrating steps of a data storage process at power shut-off.

Next, an explanation will be given of a data storage process at power shut-off, which process is performed by the microcomputer 32, with reference to a flowchart of FIG. 4. The microcomputer 32 stores, in the ROM 32b, the usage history data on the RAM 32c each time a certain amount of the usage history data is accumulated on the RAM 32c. Thus, if the output signal from the battery pack 10 is switched from the power supply permission signal to the power supply prohibition signal or the battery pack 10 is removed from the electric working machine 30 before the time to update the ROM 32b comes, power supply to the microcomputer 32 is shut off, resulting in loss of the usage history data on the RAM 32c. Thus, upon detecting decrease in a voltage input to the power supply circuit 31, the microcomputer 32 stores, in the ROM 32b, the usage history data on the RAM 32c.

Firstly, in S200, the microcomputer 32 determines whether a value of the voltage input to the power supply circuit 31 has fallen below a detection voltage value set in advance. Specifically, the microcomputer 32 determines whether a value of a voltage VC2 of the second capacitor 45 has fallen below the detection voltage value. The detection voltage value is a value greater than or equal to a value of a voltage required for the power supply circuit 31 to generate electric power of the specified voltage. In the present embodiment, the detection voltage value is a value greater than or equal to a value of a voltage required for the power supply circuit 31 to generate electric power of 5 V.

In S200, upon determining that the value of the input voltage has fallen below the detection voltage value, the microcomputer 32 proceeds to S210. At this time point, the power supply circuit 31 generates electric power of 5 V from the input electric power, and supplies the generated electric power to the microcomputer 32. In contrast, upon determining that the value of the input voltage is greater than or equal to the detection voltage value, the microcomputer 32 repeatedly performs the process of S200 until it determines that the value of the input voltage has fallen below the detection voltage value.

Subsequently, in S210, the microcomputer 32 determines whether there is any usage history data that should be written to the ROM 32b. Specifically, the microcomputer 32 determines whether there is any usage history data updated on the RAM 32c since the last write to the ROM 32b. In S210, upon determining that there is usage history data that should be written, the microcomputer 32 proceeds to S220. In contrast, upon determining that there is no usage history data that should be written, the microcomputer 32 proceeds to S240.

In S220, the microcomputer 32 outputs the ON-command signal to the power supply switch 41. With the output of the ON-command signal, a HIGH signal is output from the OR circuit 43 to the power supply switch 41, thereby bringing the power supply switch 41 to an ON state. Thus, the power supply switch 41 is switched ON before the voltage input to the power supply circuit 31 decreases to an extent that electric power of the specified voltage cannot be generated. Thus, the power supply circuit 31 can continue to generate electric power of the specified voltage.

Then, in S230, the microcomputer 32 performs the write process to write, to the ROM 32b, the usage history data on the RAM 32c. Upon completion of the write process, the microcomputer 32 proceeds to S240.

In S240, the microcomputer 32 outputs the OFF-command signal to the power supply switch 41. This makes it possible to shut down the microcomputer 32 by switching OFF the power supply switch 41 after completion of the write process.

<1-3. Operation>

<1-3-1. Operation at Large Number of Updates>

Figure 5:
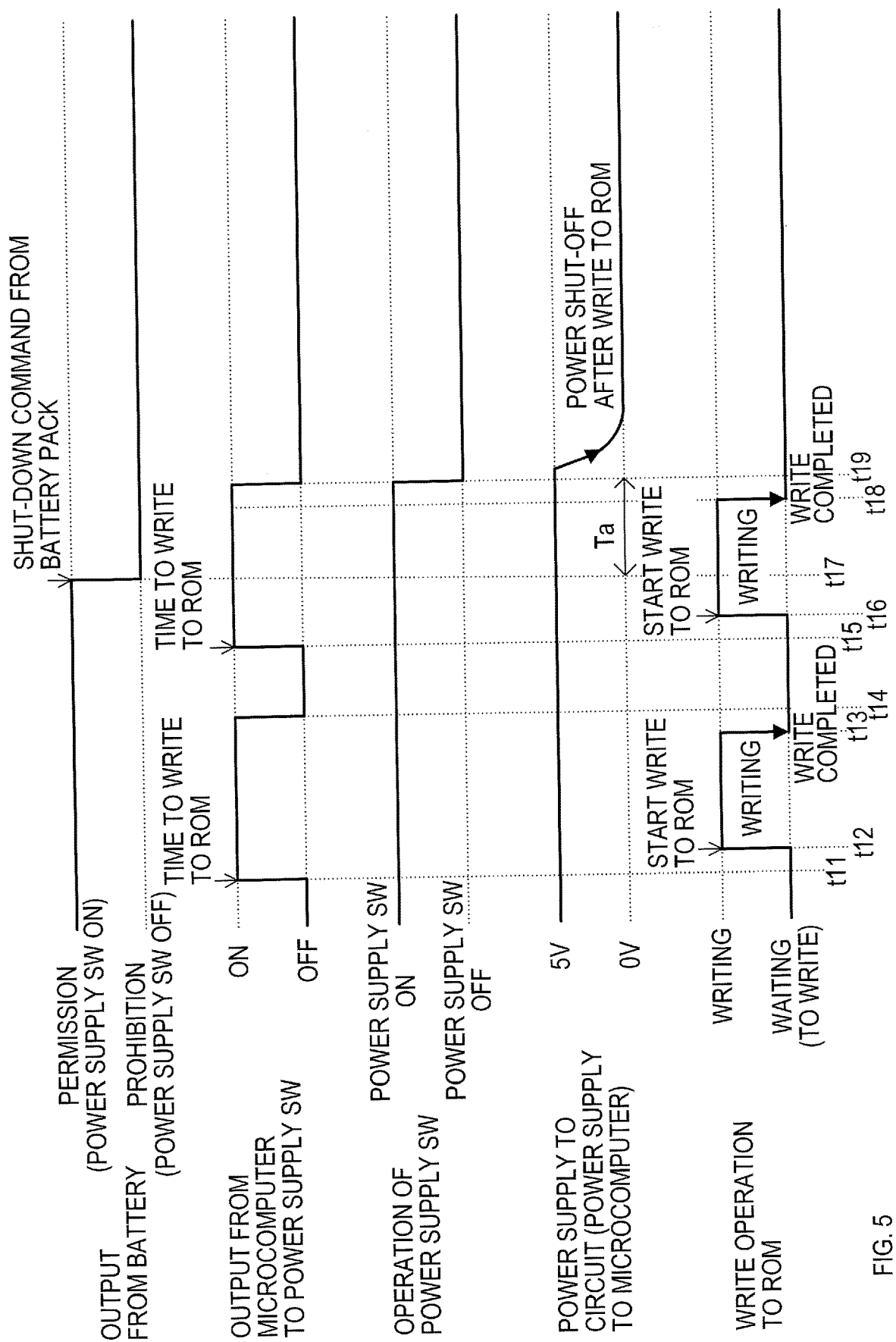
FIG. 5 is a time chart of output from a battery, output from a microcomputer, an operation of a power supply switch, power supply to a circuit, and a write operation to a ROM in the case where the number of updates has reached a specified value.

Next, an explanation will be given of an operation of the electric working machine 30 when the data storage process at large number of updates is performed, with reference to a time chart of FIG. 5.

Under circumstances where the power supply permission signal is output from the battery pack 10, at a time point t11, the number of updates of the usage history data has reached a specified value, and a time to write to the ROM 32b has come. Thus, at the time point t11, the ON-command signal is output from the microcomputer 32 to the OR circuit 43. That is, the ON-command signal is output from the microcomputer 32 to the power supply switch 41. Subsequently, at a time point t12, write to the ROM 32b is started, and the write is completed at a time point t13. Then, after completion of the write, at a time point t14, the output signal from the microcomputer 32 is switched from the ON-command signal to the OFF-command signal.

Subsequently, at a time point t15, the time to write to the ROM 32b has come again, and the output signal from the microcomputer 32 is switched from the OFF-command signal to the ON-command signal. Then, at a time point t16, write to the ROM 32b is started, and the write is completed at a time point t18.

Here, at a time point t17, where the write is being performed, the output signal from the battery pack 10 is switched from the power supply permission signal to the power supply prohibition signal. In other words, the power supply permission signal is lost at the time point t17. However, the ON-command signal is continuously output from the microcomputer 32 for a specified period of time Ta from the time point t17 to a time point t19. The specified period of time Ta is longer than a period of time required to complete the write process after loss of the power supply permission signal.

Accordingly, for a period from the time point t11 to the time point t19, at least one of the power supply permission signal or the ON-command signal is input to the OR circuit 43, and thus, a HIGH signal continues to be output from the OR circuit 43. As a result, electric power of 5 V is continuously supplied to the microcomputer 32 for the period from the time point t11 to the time point t19. On the other hand, after the time point t19, the power supply prohibition signal and the OFF-command signal are input to the OR circuit 43, and thus, a LOW signal is output from the OR circuit 43. However, since the second capacitor 45 is connected to the power supply circuit 31 even after the power supply switch 41 is switched OFF at the time point t19, the power supply circuit 31 supplies, to the microcomputer 32, electric power generated using residual electric charge of the second capacitor 45. Consequently, power supply to the microcomputer 32 is not shut off immediately at the time point t19. After the time point t19, with the decrease in the residual electric charge of the second capacitor 45, the voltage of the electric power supplied to the microcomputer 32 gradually decreases, and then power supply to the microcomputer 32 is shut off.

<1-3-2. Operation in Comparative Example>

Figure 8:
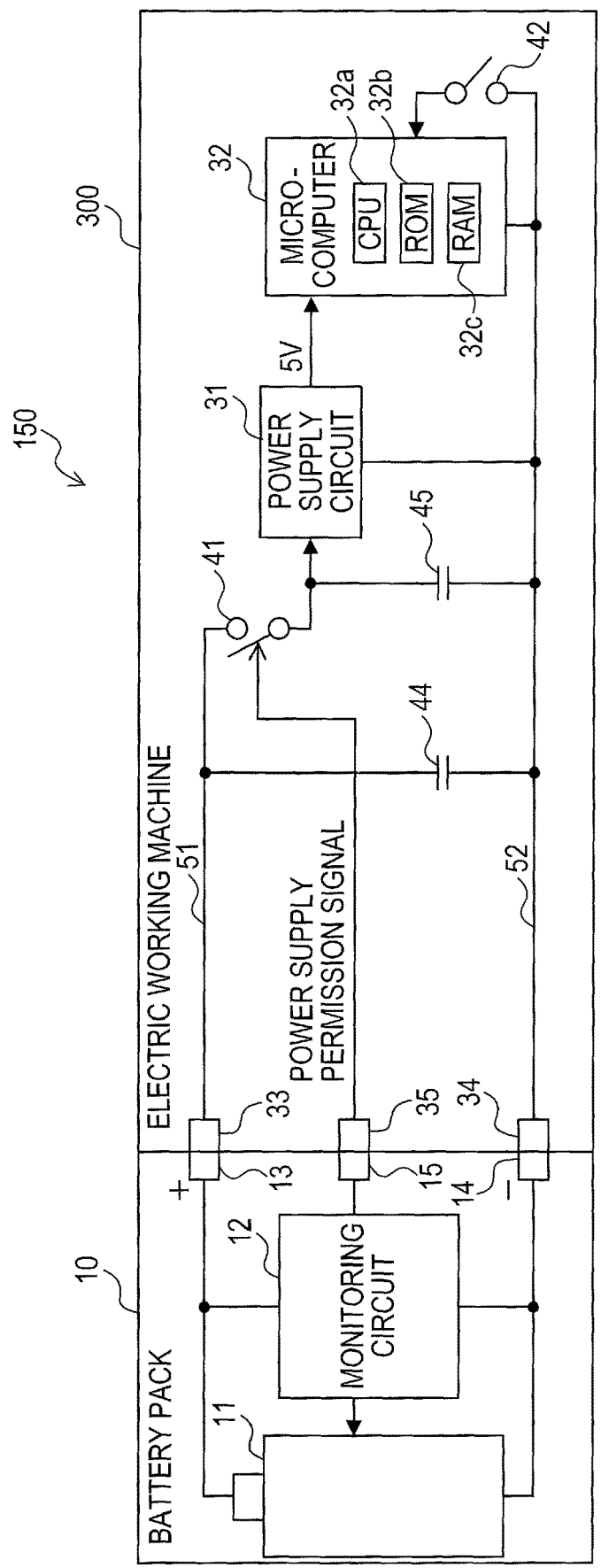
FIG. 8 is a diagram illustrating a configuration of an electric working machine system of a comparative example of the first embodiment.
Figure 9:
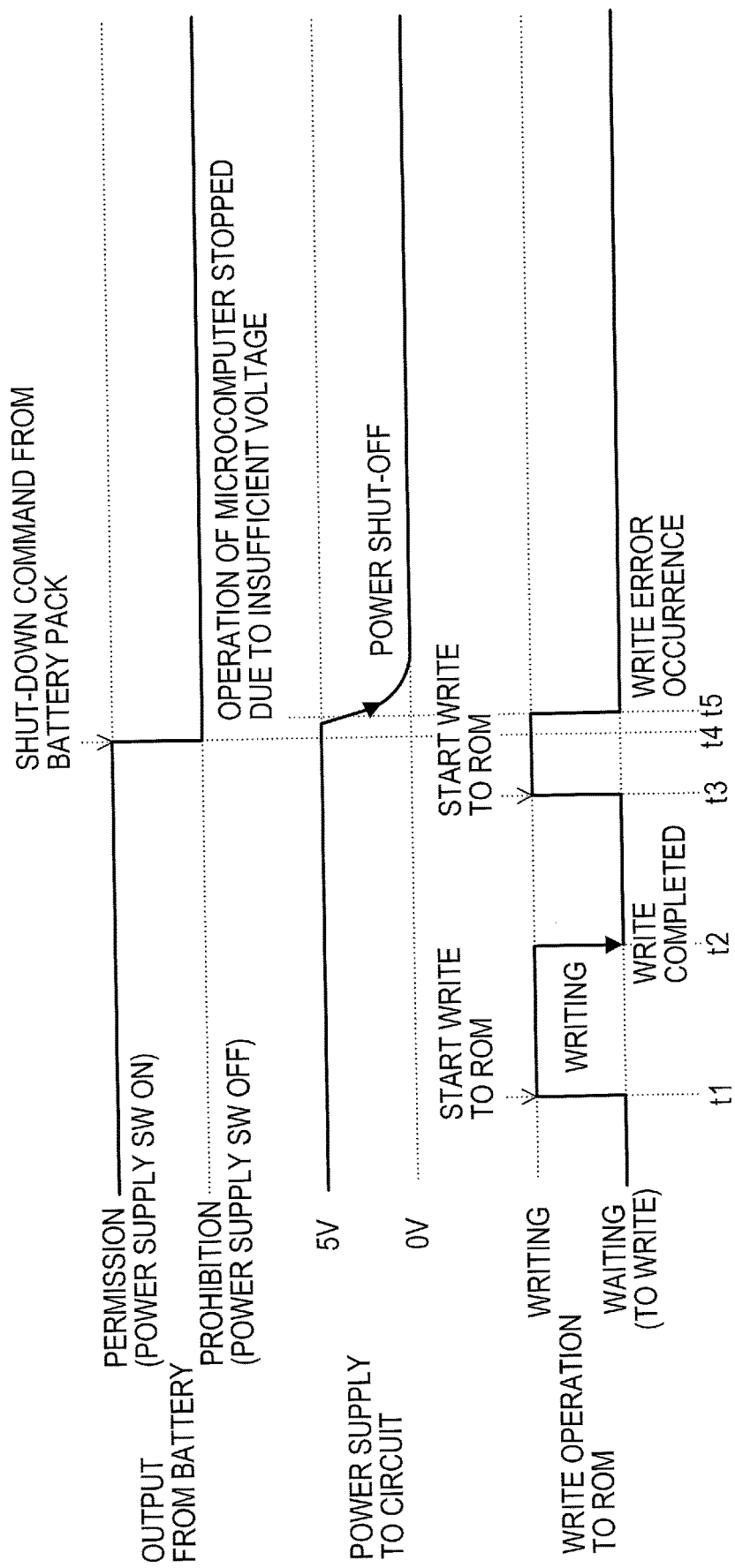
FIG. 9 is a time chart of output from a battery, power supply to a circuit, and a write operation to a ROM in a case where a shut-down command is input from a battery pack to an electric working machine in the comparative example of the first embodiment.

Next, a comparative example of the present embodiment will be described with reference to FIGS. 8 and 9. As shown in FIG. 8, an electric working machine system 150 of the comparative example includes the battery pack 10 and an electric working machine 300. The electric working machine 300 is different from the electric working machine 30 in that it does not include the OR circuit 43 and thus no ON-command signal or OFF-command signal is output from the microcomputer 32. In other words, the output signal from the battery pack 10 is output directly to the power supply switch 41 through the battery-side communication terminal 15 and the working-machine-side communication terminal 35. The power supply switch 41 is switched ON upon input of the power supply permission signal, and is switched OFF upon loss of the power supply permission signal.

Now, an operation of the electric working machine 300 will be described with reference to FIG. 9. Under circumstances where the power supply permission signal is output from the battery pack 10, write to the ROM 32b is started at a time point t1, and the write is completed at a time point t2. After that, write to the ROM 32b is started again at a time point t3, but at a time point t4, where the write is not completed, the output signal from the battery pack 10 is switched from the power supply permission signal to the power supply prohibition signal. As a result, at the time point t4, the power supply switch 41 is switched OFF, and the electric power supplied to the microcomputer 32 starts to decrease. Then, at a time point t5, a voltage of the electric power supplied to the microcomputer 32 becomes insufficient to thereby stop an operation of the microcomputer 32, resulting in occurrence of a write error.

In contrast, in the electric working machine 30 of the present embodiment, the ON-command signal continues to be output from the microcomputer 32 to the OR circuit 43 during the write process. Thus, if the output signal from the battery pack 10 is switched from the power supply permission signal to the power supply prohibition signal during the write, insufficient voltage of the electric power to the microcomputer 32 during the write can be avoided, thereby inhibiting occurrence of a write error.

<1-3-3. Operation at Sudden Input of Shut-Down Command>

Figure 6:
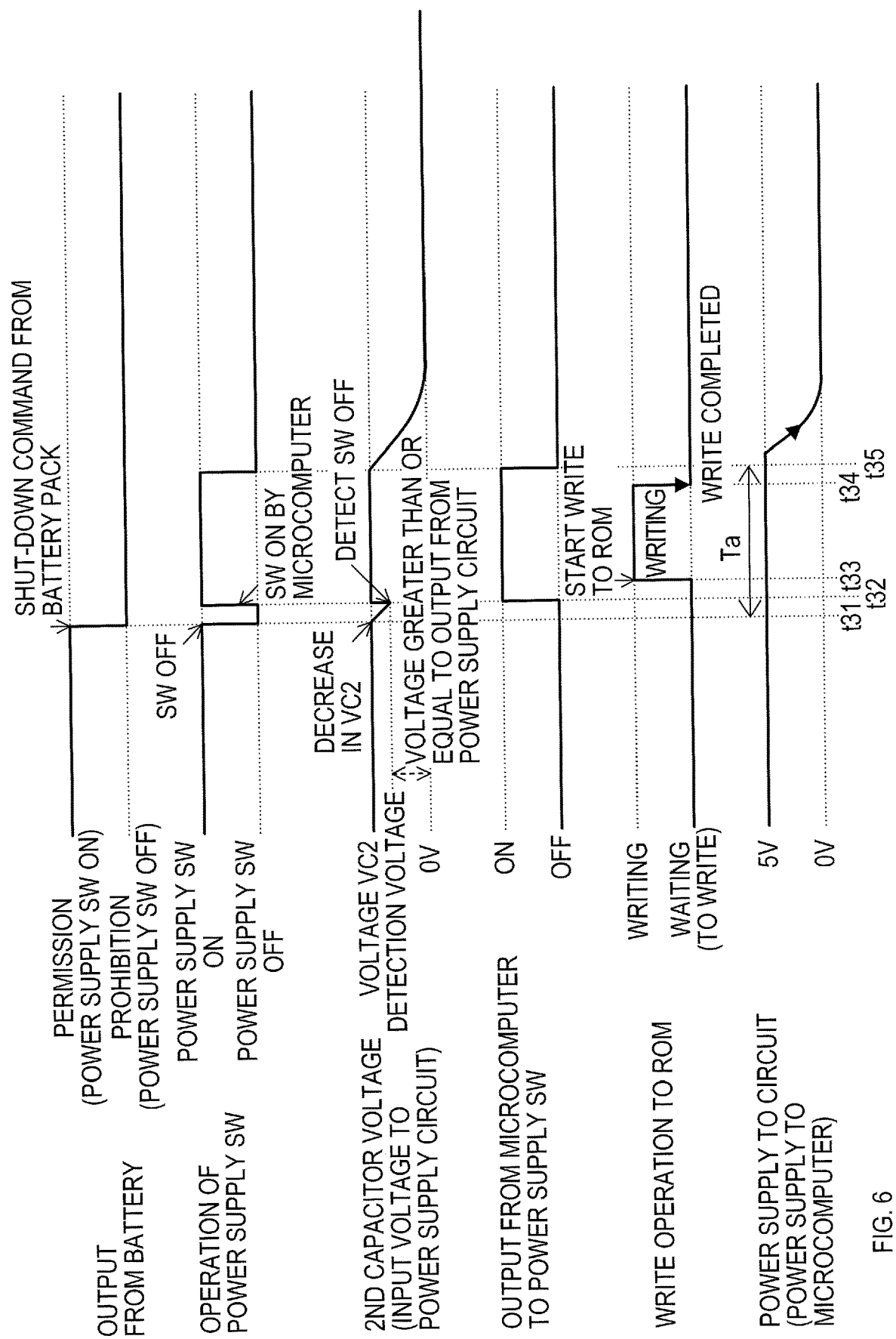
FIG. 6 is a time chart of output from the battery, an operation of the power supply switch, a voltage of a second capacitor, output from the microcomputer, a write operation to the ROM, and power supply to the circuit in a case where a shut-down command is input from a battery pack to the electric working machine.

Next, an explanation will be given of an operation of the electric working machine 30 in a case where a shut-down command is suddenly input from the battery pack 10, with reference to a time chart of FIG. 6.

At a time point t31, the output signal from the battery pack 10 is switched from the power supply permission signal to the power supply prohibition signal, and the power supply switch 41 is switched from ON to OFF. Such switching of the power supply switch 41 from ON to OFF results in a state where the only power source that is connected to the power supply circuit 31 is the second capacitor 45. Thus, the power supply circuit 31 generates electric power of the specified voltage by utilizing residual electric charge of the second capacitor 45. This causes the voltage VC2 of the second capacitor 45 to start to decrease at the time point t31.

Then, at a time point t32, the value of the voltage VC2 decreases to reach the detection voltage value, whereby an OFF state of the power supply switch 41 is detected, and the output signal from the microcomputer 32 is switched from the OFF-command signal to the ON-command signal. This results in the power supply switch 41 being switched from OFF to ON at the time point t32.

Accordingly, after the time point t32, electric power supplied from the battery pack 10 is input to the power supply circuit 31. This allows the second capacitor 45 to be recharged, whereby the voltage VC2 increases. For a period from the time point t31 to the time point t32, the power supply circuit 31 generates electric power of 5V from residual electric charge of the second capacitor 45, and after the time point t32, the power supply circuit 31 generates electric power of 5V from the electric power input from the battery pack 10.

Subsequently, at a time point t33, write to the ROM 32b is started, and the write is completed at a time point t34. After completion of the write, at a time point t35, the output signal from the microcomputer 32 is switched from the ON-command signal to the OFF-command signal. This causes the OR circuit 43 to output a LOW signal at the time point t35 to thereby switch the power supply switch 41 from ON to OFF. As a result, for a specified period of time Ta from the time point t31 to the time point t35, power supply to the microcomputer 32 is maintained. After the time point t35, the voltage of the electric power supplied to the microcomputer 32 gradually decreases, and then power supply to the microcomputer 32 is shut off.

<1-3-4. Operation at Sudden Removal of Battery Pack>

Figure 7:
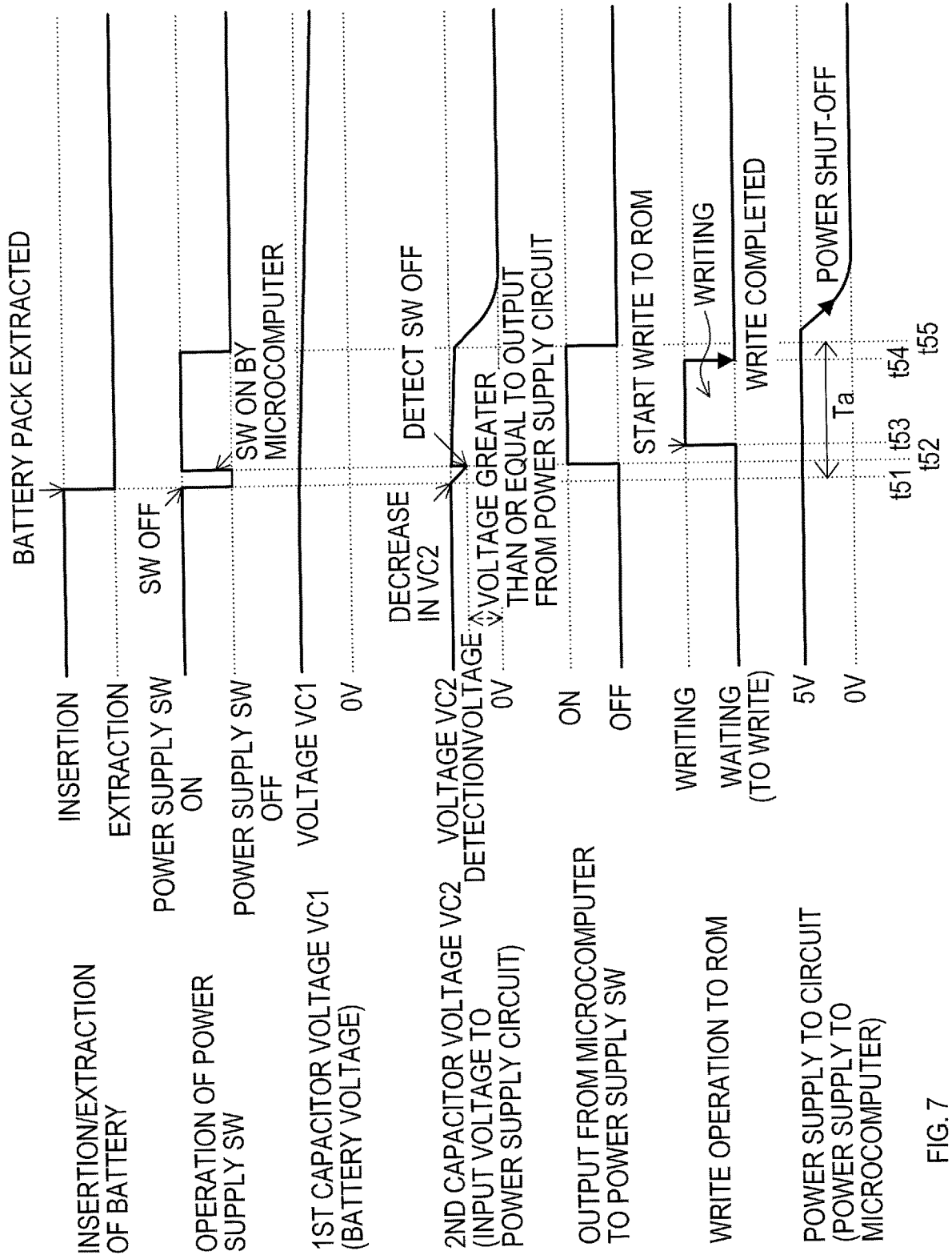
FIG. 7 is a time chart of insertion/extraction of the battery, an operation of the power supply switch, a voltage of a first capacitor, a voltage of the second capacitor, output from the microcomputer, a write operation to the ROM, and power supply to the circuit in a case where the battery pack is removed from the electric working machine.

Next, an explanation will be given of an operation of the electric working machine 30 in a case where the battery pack 10 is suddenly removed from the electric working machine 30, with reference to a time chart of FIG. 7.

At a time point t51, the battery pack 10 is removed from the electric working machine 30. Thus, the power supply permission signal is lost at the time point t51, whereby the power supply switch 41 is switched from ON to OFF. Such switching of the power supply switch 41 to OFF results in a state where the only power source that is connected to the power supply circuit 31 is the second capacitor 45. Thus, the power supply circuit 31 generates electric power of the specified voltage by utilizing residual electric charge of the second capacitor 45. This causes the voltage VC2 of the second capacitor 45 to start to decrease at the time point t51.

Then, at a time point t52, the value of the voltage VC2 decreases to reach the detection voltage value, whereby OFF of the power supply switch 41 is detected, and the output signal from the microcomputer 32 is switched from the OFF-command signal to the ON-command signal. This results in the power supply switch 41 being switched from OFF to ON at the time point t52.

The first capacitor 44 is connected to the power supply circuit 31 after the time point t52, and thus, the second capacitor 45 is recharged, whereby the voltage VC2 increases. After the time point t52, the power supply circuit 31 generates power source of 5 V from residual electric charge of the first capacitor 44. Thus, after the time point t52, a voltage VC1 of the first capacitor 44 starts to decrease. Also, the voltage VC2 of the second capacitor 45 decreases together with the voltage VC1.

Subsequently, at a time point t53, write to the ROM 32b is started, and the write is completed at a time point t54. Here, since the first capacitor 44 has a large capacitance, the voltage VC1 decreases gently. A period of time required for the input voltage from the power supply circuit 31 to fall below the detection voltage is longer than a period of time required for the write process. Thus, the microcomputer 32 can complete the write using the electric power generated from residual electric charge of the first capacitor 44.

Then, after completion of the write, at a time point t55, the output signal from the microcomputer 32 is switched from the ON-command signal to the OFF-command signal. This causes the OR circuit 43 to output a LOW signal at the time point t55, thus switching the power supply switch 41 from ON to OFF. As a result, for a specified period of time Ta from the time point t51 to the time point t55, power supply to the microcomputer 32 is maintained. After the time point t55, the voltage of the electric power supplied to the microcomputer 32 gradually decreases, and then power supply to the microcomputer 32 is shut off.

<1-3. Effects>

According to the first embodiment described so far, the following effects are obtained.

(1) Even after the power supply permission signal from the battery pack 10 to the electric working machine 30 is lost, the ON-command signal is output from the microcomputer 32 to the OR circuit 43 for the specified period of time Ta so that power supply to the microcomputer 32 is maintained. Thus, even when the power supply permission signal is lost while the microcomputer 32 is performing the write process, interruption of the write process can be avoided.

(2) Each time the number of updates of the usage history data on the RAM 32c reaches the set value, the usage history data on the RAM 32c is written to the ROM 32b. This makes it possible to avoid frequent write processes, thereby reducing the number of writes to the ROM 32b and power consumption by the microcomputer 32.

(3) In response to loss of the power supply permission signal, the write process is performed. Thus, even when the power supply permission signal is suddenly lost, the microcomputer 32 can store, in the ROM 32b, the data on the RAM 32c while outputting the ON-command signal.

(4) In the sleep mode, in which power consumption of the microcomputer 32 is reduced, the write process is not performed. Thus, the microcomputer 32 performs the write process before entering the sleep mode. This makes it possible to properly store, in the ROM 32b, the usage history data on the RAM 32c.

(5) The ON-command signal is output from the microcomputer 32 to the OR circuit 43 for a period longer than that required for the microcomputer 32 to complete the write process. This enables the microcomputer 32 to continuously receive power supply after loss of the power supply permission signal, to thereby complete the write process. Thus, the data on the RAM 32c can be stored in the ROM 32b without being damaged.

(6) When the battery pack 10 is not connected to the electric working machine 30, electric power of the first capacitor 44 is input to the power supply circuit 31 because the first capacitor 44 is connected between the positive electrode line 51 and the negative electrode line 52. Thus, in this case, electric power to be supplied to the microcomputer 32 is generated from the electric power of the first capacitor 44 input to the power supply circuit 31. Thus, even when the battery pack 10 is suddenly removed from the electric working machine 30, the power supply circuit 31 can supply the electric power to the microcomputer 32 by utilizing the first capacitor 44 as an auxiliary power source. Consequently, even when the battery pack 10 is suddenly removed from the electric working machine 30, the microcomputer 32 can perform the write process by receiving power supply for the specified period of time Ta.

(7) When the value of the voltage input to the power supply circuit 31 has fallen below the detection voltage value, the microcomputer 32 determines that the battery pack 10 has been removed from the electric working machine 30, and can thereby recognize loss of the power supply permission signal.

(8) Determination of removal of the battery pack 10 from the electric working machine 30 is made before the value of the voltage input to the power supply circuit 31 falls below the value of the voltage required to generate electric power of the specified voltage. Thus, the microcomputer 32 can continuously receive power supply from the power supply circuit 31 by outputting the ON-command signal to the power supply switch 41 before it becomes impossible for the power supply circuit 31 to generate the electric power of the specified voltage.

Second Embodiment

<2-1. Differences from First Embodiment>

A basic configuration of a second embodiment is similar to that of the first embodiment. Thus, explanation of the elements in common will not be repeated, and differences will be mainly explained. The reference numerals the same as those in the first embodiment represent the same elements, and the preceding explanations are to be referred to.

Figure 10:
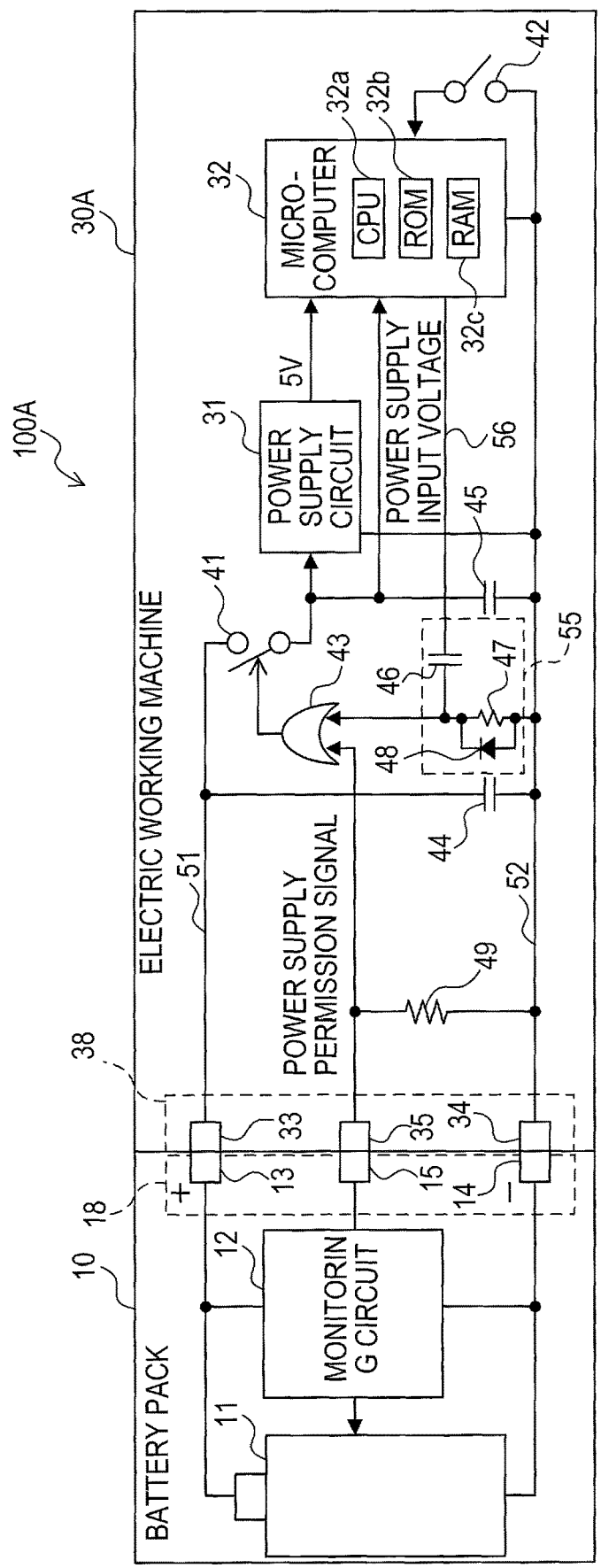
FIG. 10 is a diagram illustrating a configuration of an electric working machine system of a second embodiment.

As shown in FIG. 10, an electric working machine system 100A of the second embodiment includes the battery pack 10 and an electric working machine 30A. The electric working machine 30A of the second embodiment is different from the electric working machine 30 of the first embodiment in that it includes a differentiating circuit 55.

The differentiating circuit 55 is provided on a transmission path 56 of the ON-command signal output from the microcomputer 32. The transmission path 56 extends from the microcomputer 32 to the power supply switch 41. More specifically, the differentiating circuit 55 is provided between the microcomputer 32 and the second input terminal of the OR circuit 43.

The differentiating circuit 55 includes a third capacitor 46, a resistor 47, and a diode 48. The resistor 47 is connected between the second input terminal of the OR circuit 43 and the negative electrode line 52. The third capacitor 46 is connected between: a connection point between the second input terminal of the OR circuit 43 and the resistor 47; and the microcomputer 32. The diode 48 is connected in parallel with the resistor 47 such that an anode is connected to the negative electrode line 52 and a cathode is connected to the second input terminal.

A time constant of the differentiating circuit 55 is determined based on a capacitance of the third capacitor 46 and a value of resistance of the resistor 47, and is set to a length longer than or equal to a period of time required from start to completion of the write process to the ROM 32b. The diode 48 is provided to avoid a negative voltage from being input to the second input terminal of the OR circuit 43 when the output signal from the microcomputer 32 to the OR circuit 43 is switched from a HIGH signal to a LOW signal.

<2. Operation>

Figure 11:
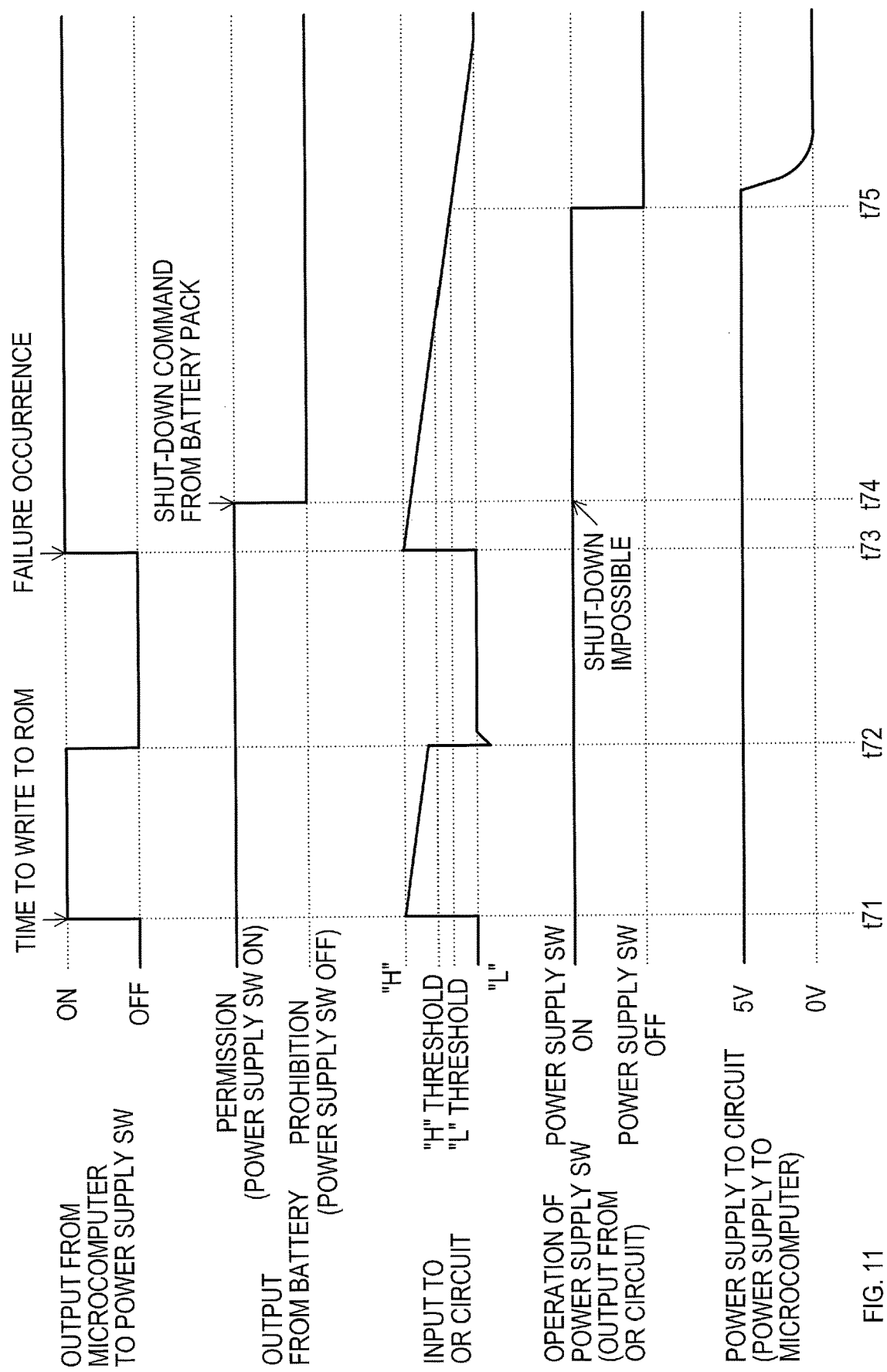
FIG. 11 is a time chart of output from a microcomputer, output from a battery, input to an OR circuit, an operation of a power supply switch, and power supply to a circuit in a case where power supply can be shut off at occurrence of a failure of the microcomputer.

Next, an explanation will be given of an operation of the electric working machine 30A at occurrence of a failure of the microcomputer 32, with reference to a time chart of FIG. 11.

Under circumstances where the power supply permission signal is output from the battery pack 10, at a time point t71, the number of updates of the usage history data has reached a specified value, and a time to write to the ROM 32b has come. Thus, at the time point t71, the ON-command signal is output from the microcomputer 32 to the OR circuit 43. This results in input of a HIGH signal to the second input terminal of the OR circuit 43 via the differentiating circuit 55. After the time point t71, a value of a voltage of the signal input to the second input terminal of the OR circuit 43 decreases according to the time constant of the differentiating circuit 55.

Then, after completion of the write process, at a time point t72, the output signal from the microcomputer 32 is switched from the ON-command signal to the OFF-command signal. Here, the time constant of the differentiating circuit 55 is set to the length longer than or equal to the period of time required for the write process. That is, the time constant of the differentiating circuit 55 is set such that a value of a voltage of an output signal from the differentiating circuit 55 is larger than a HIGH threshold when the write process is completed. Thus, for a period from the time point t71 to the time point t72, the signal input to the second input terminal of the OR circuit 43 is a HIGH signal. Accordingly, since the HIGH signal is output from the OR circuit 43 for the period from the time point t71 to the time point t72, the power supply switch 41 is maintained to be in an ON state, and electric power of 5 V is thereby supplied to the microcomputer 32.

Subsequently, at a time point t73, a failure occurs in the microcomputer 32, and the ON-command signal continues to be output from the microcomputer 32 after the time point t73. This results in input of a HIGH signal to the differentiating circuit 55 after the time point t73.

Then, at a time point t74, the output signal from the battery pack 10 is switched from the power supply permission signal to the power supply prohibition signal. This results in input of a LOW signal to the first input terminal of the OR circuit 43. On the other hand, the output signal from the differentiating circuit 55 is input to the second input terminal of the OR circuit 43. The value of the voltage of the output signal from the differentiating circuit 55 is larger than the HIGH threshold at the time point t74, and thus, the signal input to the second input terminal of the OR circuit 43 is a HIGH signal. Accordingly, at the time point t74, the HIGH signal is output from the OR circuit 43 to thereby maintain the power supply switch 41 to be in the ON state, and thus, power supply to the microcomputer 32 is not shut off.

After that, at a time point t75, a value of a voltage of the signal input to the second input terminal of the OR circuit 43 falls below a LOW threshold, and the signal input to the second input terminal is switched from a HIGH signal to a LOW signal. As a result, the power supply switch 41 is switched from ON to OFF at the time point t75. After the time point t75, the voltage of the electric power supplied to the microcomputer 32 gradually decreases, and then power supply to the microcomputer 32 is shut off. That is, since the output signal from the microcomputer 32 is input to the second input terminal of the OR circuit 43 via the differentiating circuit 55, power supply to the microcomputer 32 can be shut off even when the failure occurs in which the ON-command signal continues to be output from the microcomputer 32. Consequently, the battery pack 10 can be protected properly when the battery pack 10 is in an overdischarge state.

Figure 12:
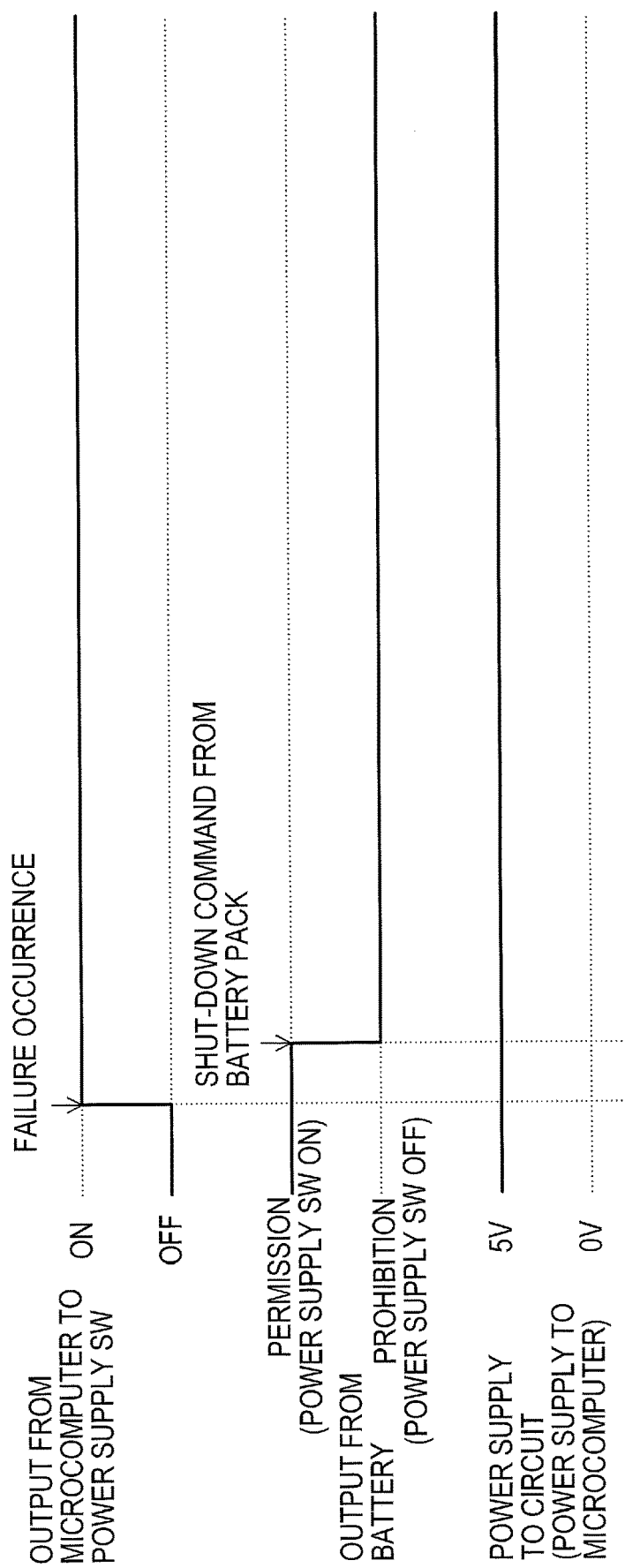
FIG. 12 is a time chart of output from a microcomputer, output from a battery, and power supply to a circuit in a case where power supply cannot be shut off at occurrence of a failure of the microcomputer.

In contrast, FIG. 12 shows a time chart of an operation in a case where the output signal from the microcomputer 32 is input to the second input terminal of the OR circuit 43 not via the differentiating circuit 55.

When the failure occurs in which the ON-command signal continues to be output from the microcomputer 32, even after the output signal from the battery pack 10 is switched from the power supply permission signal to the power supply prohibition signal, power supply to the microcomputer 32 cannot be shut off, and the electric power continues to be supplied to the microcomputer 32.

<3. Effects>

According to the second embodiment described so far, the following effects are obtained in addition to the above-described effects (1) to (8) of the first embodiment.

(9) By providing the differentiating circuit 55 on an output path of the ON-command signal from the microcomputer 32, the ON-command signal is input to the OR circuit 43 via the differentiating circuit 55. Thus, even when the ON-command signal continues to be output due to the failure of the microcomputer 32, continued input of the HIGH signal to the second input terminal of the OR circuit 43 can be avoided. Accordingly, if the failure occurs in the microcomputer 32 and also the power supply permission signal is lost, power supply to the microcomputer 32 can be shut off by switching OFF the power supply switch 41 after lapse of a period of time according to the time constant of the differentiating circuit 55.

Other Embodiments

The embodiments for carrying out the present disclosure have been described so far; however, the present disclosure is not limited to the above-described embodiments and can be carried out in variously modified forms.

(a) In the above-described embodiments, the usage history data is written to the ROM 32b in the write process. However, the data written to the ROM 32b is not limited to the usage history data. Settings of the electric working machines 30 and 30A at the end of the last use thereof may be written to the ROM 32b so that, when use of the electric working machines 30 and 30A is resumed, the electric working machines 30 and 30A can be used in a state at the end of the last use. For example, if the electric working machines 30 and 30A are laser marking devices, an illumination pattern mode of laser light may be written to the ROM 32b.

(b) In the above-described embodiments, the ON-command signal is output from the microcomputer 32 so that power supply to the microcomputer 32 is not shut off during the write process. However, the process hindered by shut-off of power supply to the microcomputer 32 during the process is not limited to the write process. The ON-command signal may be output from the microcomputer 32 so that power supply to the microcomputer 32 is not shut off during the process other than the write process. For example, if the electric working machines 30 and 30A are nailers, the ON-command signal may be output from the microcomputer 32 so that power supply to the microcomputer 32 is not shut off until driving of a nail/nails is completed.

(c) Two or more functions performed by a single element in the above-described embodiments may be achieved by two or more elements, and a single function performed by a single element may be achieved by two or more elements. Two or more functions performed by two or more elements may be achieved by a single element, and a single function performed by two or more elements may be achieved by a single element. Part of a configuration in the above-described embodiments may be omitted. At least part of a configuration in the above-described embodiments may be added to or replace another configuration in the above-described embodiments.

What is claimed is:

1. An electric working machine, comprising:
a connection port including a positive terminal, a negative terminal, and a communication terminal, the connection port being configured to be connected to a battery pack;
a control circuit configured to control an operation of the electric working machine;
an OR circuit including a first input terminal, a second input terminal, and an output terminal, the first input terminal being configured to be connected to the communication terminal, the second input terminal being configured to be connected to the control circuit, the output terminal being configured to output an ON signal in response to input of a power supply permission signal to the first input terminal and/or input of an ON-command signal to the second input terminal, the power supply permission signal permitting the control circuit to receive an electric power from the battery pack;
a power supply circuit connected to the positive terminal and to the negative terminal, the power supply circuit being configured to generate, from a first electric power input thereto, a second electric power to be supplied to the control circuit;
a power supply path connecting the positive terminal to the power supply circuit; and
a power supply switch provided on the power supply path, the power supply switch being configured to maintain an ON state while the ON signal is output from the output terminal, the power supply path being configured to maintain a completed state while the power supply switch is in the ON state,
the control circuit being configured to output the ON-command signal to the second input terminal for a set period of time in response to loss of the power supply permission signal input from the battery pack to the communication terminal.

2. An electric working machine, comprising:
a connection port including a communication terminal and configured to be connected to a battery pack;
a control circuit configured to control an operation of the electric working machine;
a power supply path extending from the battery pack connected to the connection port to the control circuit;
a power supply switch provided on the power supply path the power supply path being configured to maintain a completed state while the power supply switch is in an ON state;
a first connection line connected to the communication terminal and configured to receive a power supply permission signal from the battery pack via the communication terminal, the power supply permission signal permitting the control circuit to receive an electric power from the battery pack;
a second connection line connected to the control circuit and configured to receive an ON-command signal from the control circuit; and
a switch drive circuit provided independently of the control circuit, the switch drive circuit having a first input terminal connected to the first connection line and a second input terminal connected to the second connection line, the first input terminal receiving the power supply permission signal, and the second input terminal receiving the ON-command signal, the switch drive circuit being configured to maintain the ON state of the power supply switch during input of the power supply permission signal to the switch drive circuit and/or input of the ON-command signal to the switch drive circuit,
the control circuit being configured to output the ON-command signal to the power supply switch for a set period of time in response to loss of the power supply permission signal from the battery pack, the ON-command signal bringing the power supply switch to the ON state.

3. The electric working machine according to claim 2, wherein the control circuit outputs the ON-command signal to the power supply switch before performing a specified process.

4. The electric working machine according to claim 2, wherein the power supply permission signal is lost in response to: (i) switching of a signal output from the battery pack to the electric working machine from the power supply permission signal to a power supply prohibition signal; or (ii) removal of the battery pack from the connection port, the power supply prohibition signal prohibiting the control circuit from receiving the electric power from the battery pack.

5. The electric working machine according to claim 2, wherein the battery pack includes a first terminal and a second terminal, the first terminal being electrically connected to a positive electrode of the battery pack, the second terminal being electrically connected to a negative electrode of the battery pack,
wherein the connection port includes a positive terminal and a negative terminal, the positive terminal being configured to be connected to the first terminal, the negative terminal being configured to be connected to the second terminal,
wherein the electric working machine further comprises:
an electrolytic capacitor connected across the positive terminal and the negative terminal; and
a power supply circuit connected across the positive terminal and the negative terminal, the power supply circuit being configured to generate, from a first electric power input thereto, a second electric power to be supplied to the control circuit.

6. An electric working machine comprising:
a connection port configured to be connected to a battery pack;
a control circuit configured to control an operation of the electric working machine;
a power supply switch provided on a power supply path extending from the battery pack connected to the connection port to the control circuit, the power supply switch being configured to maintain an ON state while a power supply permission signal is output from the battery pack to the electric working machine, the power supply path being configured to maintain a completed state while the power supply switch is in the ON state, the power supply permission signal permitting the control circuit to receive an electric power from the battery pack; and a differentiating circuit provided on a transmission path, the transmission path being a path for transmission of an ON-command signal and extending from the control circuit to the power supply switch, and the control circuit being configured to output the ON-command signal to the power supply switch for a set period of time in response to loss of the power supply permission signal from the battery pack, the ON-command signal bringing the power supply switch to the ON state.

7. An electric working machine comprising:

a connection port configured to be connected to a battery pack;

a control circuit configured to control an operation of the electric working machine; and a power supply switch provided on a power supply path extending from the battery pack connected to the connection port to the control circuit, the power supply switch being configured to maintain an ON state while a power supply permission signal is output from the battery pack to the electric working machine, the power supply path being configured to maintain a completed state while the power supply switch is in the ON state, the power supply permission signal permitting the control circuit to receive an electric power from the battery pack, the control circuit being configured to output an ON-command signal to the power supply switch for a set period of time in response to loss of the power supply permission signal from the battery pack, the ON-command signal bringing the power supply switch to the ON state, the control circuit being configured to output the ON-command signal to the power supply switch before performing a specified process, the control circuit including a first memory and a second memory, the specified process including a write process, the write process being a process of writing, to the second memory, a data on the first memory, and the control circuit being configured to perform the write process in response to a number of updates of the data on the first memory reaching a set value.

8. The electric working machine according to claim 7, wherein the set period of time is longer than a period of time required from start to completion of the write process by the control circuit in response to loss of the power supply permission signal.

9. An electric working machine comprising:

a connection port configured to be connected to a battery pack;

a control circuit configured to control an operation of the electric working machine; and a power supply switch provided on a power supply path extending from the battery pack connected to the connection port to the control circuit, the power supply switch being configured to maintain an ON state while a power supply permission signal is output from the battery pack to the electric working machine, the power supply path being configured to maintain a completed state while the power supply switch is in the ON state, the power supply permission signal permitting the control circuit to receive an electric power from the battery pack, the control circuit being configured to output an ON-command signal to the power supply switch for a set period of time in response to loss of the power supply permission signal from the battery pack, the ON-command signal bringing the power supply switch to the ON state, the control circuit being configured to output the ON-command signal to the power supply switch before performing a specified process, the control circuit including a first memory and a second memory, wherein the specified process including a write process, the write process being a process of writing, to the second memory, a data on the first memory, and the control circuit being configured to perform the write process in response to loss of the power supply permission signal from the battery pack.

10. The electric working machine according to claim 9, wherein the set period of time is longer than a period of time required from start to completion of the write process by the control circuit in response to loss of the power supply permission signal.

11. An electric working machine comprising:

a connection port configured to be connected to a battery pack;

a control circuit configured to control an operation of the electric working machine; and a power supply switch provided on a power supply path extending from the battery pack connected to the connection port to the control circuit, the power supply switch being configured to maintain an ON state while a power supply permission signal is output from the battery pack to the electric working machine, the power supply path being configured to maintain a completed state while the power supply switch is in the ON state, the power supply permission signal permitting the control circuit to receive an electric power from the battery pack, the control circuit being configured to output an ON-command signal to the power supply switch for a set period of time in response to loss of the power supply permission signal from the battery pack, the ON-command signal bringing the power supply switch to the ON state, the control circuit being configured to output the ON-command signal to the power supply switch before performing a specified process, the electric working machine further comprising an operation switch configured to be operated by a user to operate or stop the electric working machine, the control circuit including a first memory and a second memory, the specified process including a write process, the write process being a process of writing, to the second memory, a data on the first memory, the control circuit being configured to perform the write process in response to the operation switch being turned from ON to OFF, and the control circuit being configured to enter a sleep mode in response to completion of the write process, the control circuit being reduced in power consumption in the sleep mode.

12. The electric working machine according to claim 11, wherein the set period of time is longer than a period of time required from start to completion of the write process by the control circuit in response to loss of the power supply permission signal.

13. An electric working machine comprising:
a connection port configured to be connected to a battery pack;
a control circuit configured to control an operation of the electric working machine; and
a power supply switch provided on a power supply path extending from the battery pack connected to the connection port to the control circuit, the power supply switch being configured to maintain an ON state while a power supply permission signal is output from the battery pack to the electric working machine, the power supply path being configured to maintain a completed state while the power supply switch is in the ON state, the power supply permission signal permitting the control circuit to receive an electric power from the battery pack,
the control circuit being configured to output an ON-command signal to the power supply switch for a set period of time in response to loss of the power supply permission signal from the battery pack, the ON-command signal bringing the power supply switch to the ON state,
the battery pack including a first terminal and a second terminal, the first terminal being electrically connected to a positive electrode of the battery pack, the second terminal being electrically connected to a negative electrode of the battery pack,
the connection port including a positive terminal and a negative terminal, the positive terminal being configured to be connected to the first terminal, the negative terminal being configured to be connected to the second terminal,
the electric working machine further comprising:
an electrolytic capacitor connected across the positive terminal and the negative terminal; and
a power supply circuit connected across the positive terminal and the negative terminal, the power supply circuit being configured to generate, from a first electric power input thereto, a second electric power to be supplied to the control circuit, and
the control circuit determining that the battery pack has been removed from the connection port in response to a value of a voltage input to the power supply circuit falling below a detection voltage value that has been set.

14. The electric working machine according to claim 13, wherein the detection voltage value is greater than or equal to a value of a voltage required for the power supply circuit to generate the electric power of a set voltage.

* * * * *